(12) United States Patent
Duret et al.

(10) Patent No.: US 7,791,332 B2
(45) Date of Patent: Sep. 7, 2010

(54) CURRENT-LOOP POSITION SENSOR AND ROLLING BEARING EQUIPPED WITH THE SAME

(75) Inventors: Christophe Duret, Quintal (FR); Olivier Blanchin, Annecy (FR)

(73) Assignee: S.N.R. Roulements, Annecy (FR)

( * ) Notice: Subject to any disclaimer, the term of this patent is extended or adjusted under 35 U.S.C. 154(b) by 282 days.

(21) Appl. No.: 11/792,938

(22) PCT Filed: Dec. 19, 2005

(86) PCT No.: PCT/FR2005/051111

§ 371 (c)(1),
(2), (4) Date: May 5, 2008

(87) PCT Pub. No.: WO2006/064169

PCT Pub. Date: Jun. 22, 2006

(65) Prior Publication Data

US 2008/0272770 A1  Nov. 6, 2008

(30) Foreign Application Priority Data

Dec. 17, 2004 (FR) .................................. 04 53053

(51) Int. Cl.
*G01B 7/30* (2006.01)
*G01R 33/09* (2006.01)

(52) U.S. Cl. ............. 324/207.25; 324/207.21; 324/252

(58) Field of Classification Search ............ 324/207.21, 324/207.25, 252; 73/514.31, 514.39
See application file for complete search history.

(56) References Cited

U.S. PATENT DOCUMENTS

| 5,047,716 | A | 9/1991 | Katagiri et al. | |
| 5,589,768 | A | 12/1996 | Ishiyama et al. | |
| 7,237,960 | B2 * | 7/2007 | Oohira et al. | 384/448 |
| 7,265,543 | B2 * | 9/2007 | Witcraft et al. | 324/252 |
| 7,537,388 | B2 * | 5/2009 | Koike et al. | 384/448 |

* cited by examiner

*Primary Examiner*—Bot L LeDynh
(74) *Attorney, Agent, or Firm*—Arent Fox LLP

(57) ABSTRACT

The invention concerns a system for determining the position of mobile element relative to a stationary structure, the system comprising an encoder configured to emit a pseudo-sinusoidal spatial signal representing the position of the encoder, a sensor (2) comprising a current-loop mount between at least two resistive elements (3) and a signal processing device $V_i$ configured to supply two quadrature signals respectively SIN and COS of same amplitude. The invention also concerns an antifriction bearing equipped with such a system for determining the angular position of the rotating ring relative to the stationary ring.

15 Claims, 6 Drawing Sheets

CURRENT-LOOP POSITION SENSOR AND ROLLING BEARING EQUIPPED WITH THE SAME

CROSS-REFERENCE TO RELATED APPLICATION

This application is a National Stage entry of International Application No. PCT/FR05/051111, filed Dec. 19, 2005, the entire specification claims and drawings of which are incorporated herewith by reference.

The invention relates to a system for determining the position of a mobile element in relation to a fixed structure, as well as a rolling bearing equipped with such a system for determining the angular position of the rotating ring in relation to the fixed ring.

In numerous applications, it is desirable to know in real time and with consistent quality the position of a mobile element in relation to a fixed structure. In particular, this knowledge can be used to determine, among others, the speed, acceleration or direction of movement of the element.

U.S. Pat. No. 5,047,716 describes the general principle of a motion sensor comprising a support having rotary or linear magnetic encoding. In this solution of the prior art, the encoded support has a spatial frequency λ. It interacts with a series of magnetic resistant sensors arranged at intervals of $(n-\frac{1}{2})\lambda$ supplying signals with opposite phase. This detector requires a considerable number of sensors. It further relates to a general scope of application and not to integration in a rolling bearing of a motor vehicle wheel.

The invention has a typical application in determining at least one parameter of the movement of a motor vehicle in which at least one wheel rolling bearing comprises a determination system, where said parameter can be used in dynamic control systems of the vehicle, such as, for example, ABS or ESP.

It is known, in particular from document FR-A-2,792,403, to use an encoder designed to be solidly attached to a mobile element and a fixed sensor comprising sensitive elements arranged at read range from the encoder. The sensitive elements are arranged so as to deliver signals in substantially perfect quadrature, from which it is possible to calculate the relative position of the encoder in relation to the sensor as well as the movement parameters of said encoder.

This type of determination system is perfectly satisfactory when the Hall-effect sensitive elements are arranged at air-gap distance from a multipolar magnetic encoder.

However, in particular for resistive sensitive elements, there is still a need for a conditioning that makes it possible to reliably and exactly determine the position of a mobile element. In particular, such conditioning must enable the following in the analogue domain:

amplification, in order to provide a signal of sufficient level for the rest of the processing chain;
correction of the offset, in order to remove an undesired continuous component from it;
noise suppression, for example of common-mode or high-frequency noise;
correction of drift phenomena, for example in temperature; filtering, for example to prevent spectrum folding.

For this purpose, it is known to use a Wheatstone bridge assembly which requires the use of perfectly adjusted resistances in order to cancel the offset of the bridge, precisely positioning these resistances in relation to the signal emitted by the conductor and not introducing any additional measurement noise. As it is difficult to meet all these constraints industrially, the use of this type of assembly leads to determination precisions that are not always satisfactory.

Furthermore, in the specific case of detecting a pseudo-sinusoidal spatial signal using resistive element of the magnetoresistive resistive element type, in particular with tunnel effect, it is even more difficult to meet all the constraints of the Wheatstone bridges. In particular, due to the structure of such resistive elements that comprise the superimposition of nanometric layers, it is very difficult to set the value of the resistance precisely with zero excitation.

The invention aims mainly to solve the problems mentioned above by providing a determination system allowing conditioning of the resistive elements, in particular of magnetoresistive type, which is capable of reliable, flexible determination of the position of the mobile element.

In particular, the determination system according to the invention enables spatial sampling of a pseudo-sinusoidal signal emitted by the encoder and signal processing that allows precise determination in a particularly constraint-tolerant manner of the possible signal errors emitted by the resistive elements and of the position of said elements in relation to the pseudo-sinusoidal signal emitted.

For this purpose, according to a first aspect, the invention provides a system for determining the position of a mobile element in relation to a fixed structure, said system comprising:

an encoder designed to be solidly attached to the mobile element in order to move together with the latter, said encoder being arranged to emit a pseudo-sinusoidal signal that represents the position of the encoder;
a sensor designed to be solidly attached to the fixed structure, said sensor comprising:
at least two resistive elements capable of each delivering a signal $V_i$ according to the pseudo-sinusoidal signal emitted, said resistive elements being disposed at read range from the pseudo-sinusoidal signal emitted by the encoder;
current loop assembly of the resistive elements;
a device for processing the signals $V_i$, arranged to supply, according to the signals $V_i$, two signals, SIN and COS respectively, in quadrature and with the same amplitude;
a device for calculating the position of the element, said device comprising means for calculating the position of the encoder from the SIN and COS signals so as to deduce the position of the element from the calculated position of the encoder.

According to a second aspect, the invention provides an rolling bearing comprising a fixed ring and a ring rotating in relation to said fixed ring by means of rolling bodies, said rolling bearing being equipped with such a system for determining the angular position of the rotating ring in relation to the fixed ring, wherein the encoder is solidly attached to the rotating ring and the sensor is solidly attached to the fixed ring.

Further objectives and advantages of the invention will become apparent from the following description made in reference to the appended drawings, wherein:

in FIG. 6a the spatial signal is locally similar to a portion of a sine curve and, in FIG. 6b, the spatial signal is sinusoidal;

Figure 1:
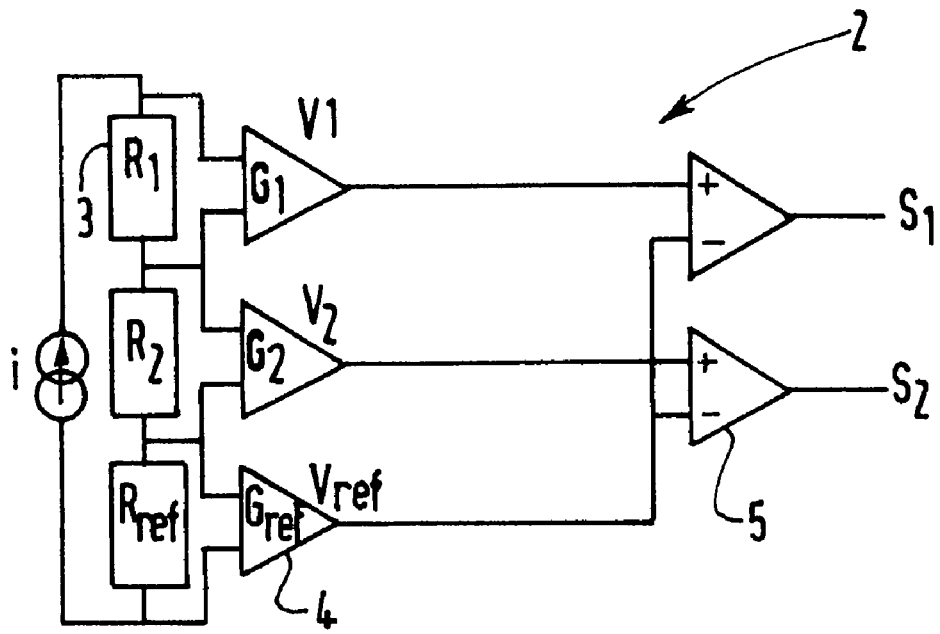
FIG. 1 is a functional representation of a first embodiment of a sensor of a determination system according to the invention.

The invention relates to a system for determining the position of a mobile element in relation to a fixed structure, which comprises:
- an encoder 1 designed to be solidly attached to the mobile element in order to move together with the latter, said encoder being arranged to emit a pseudo-sinusoidal signal that represents the position of the encoder 1; and
- a sensor 2 designed to be solidly attached to the fixed structure, said encoder comprising at least two resistive elements 3 each capable of emitting a signal $V_i$ according to the sinusoidal signal emitted by the encoder 1.

In the context of the invention, a large number of encoder 1/resistive element 3 assemblies can be used, including electric, magnetic, optical, thermal or acoustic encoders and resistive elements based on elements with impedance that can vary according to the types of signals emitted by these encoders. In one specific example, the encoder 1 is of the magnetic type and comprises an alternating succession of north and south magnetic poles such as to emit a pseudo-sinusoidal magnetic signal, and the resistive elements 3 are of magnetoresistive type, in particular magnetoresistors, giant magnetoresistors or tunnel effect magnetoresistors.

In the context of the invention, pseudo-sinusoidal signal is understood to mean any signal that is sinusoidal by nature or in which at least one portion can be correctly approximated to a sine curve.

In one example of an embodiment of the invention, the resistive elements 3 are of the type described in document FR-A-2,852,400, which is to say, comprising a stack of a reference element, of a separation element, and of an element that is sensitive to the magnetic field. The reference element and the sensitive element respectively have first and second magnetic anisotropies in first and second directions. The sensitive element comprises the superposition of a layer of ferromagnetic material and a layer of anti-ferromagnetic material arranged to obtain magnetic momentum wherein the component placed in the direction of the field to be measured varies reversibly according to the intensity of the magnetic field to be measured, and linearly in an adjustable field range.

As an example, such a magnetoresistive sensitive element 3 with tunnel effect is formed by the following stack:

Glass/Ta (5 nm)/Co (10 nm)/IrMn (10 nm)/Co (10 nm)/AlOx/Co (2 nm)/Co$_{80}$Pt$_{20}$ (5 nm)/Pt (4 nm). Glass forms the substrate and the Ta/Co bilayer is the buffer layer. The sensitive element is made up of the IrMn (10 nm)/Co (10 nm) bilayer. The reference element Co (2 nm)/Co$_{80}$Pt$_{20}$ (5 nm) consists of cobalt with platinum added to it to increase the coercive force. The Pt (4 nm) layer is a protective layer.

By arranging the resistive elements 3 at read range from the pseudo-sinusoidal signal emitted by the encoder 1, the invention makes it possible to determine the position of an element mobile in translation or rotation in relation to the fixed structure, movement which can be periodic over time or even discrete. In addition, it is possible to determine the distance separating the resistive elements 3 of the encoder 1 by means of a determination system according to the invention.

The sensor 2 of the determination system comprises a current loop assembly between the resistive elements 3 and a device for processing the signals $V_i$ arranged to supply, according to the signals $V_i$, two signals, SIN and COS respectively, in quadrature and with the same amplitude, said amplitude being proportional to the amplitude of the signal emitted by the encoder 1.

The sensor 2 can be provided in one part, which is to say comprising a support on which the resistive elements 3 and the conditioning (current source and processor) as well as possibly the calculator 7 are arranged.

As a variation, the sensor 2 can comprise two parts, a first part supporting the resistive elements 3 at read range from the encoder 1 and a second part comprising the conditioning as well as possibly the calculator 7, the two parts being connected to each other by a number of connection wires at least equal to the number of resistive elements plus one. The latter embodiment has the particular advantage of being able to place the conditioning at a distance from the encoder 1 and thus from the mobile element, in order to avoid disturbances, such as a high temperature, temperature or moisture variations which are potentially harmful for the correct operation of the conditioning, in particular of the differential amplifiers.

Figure 2:
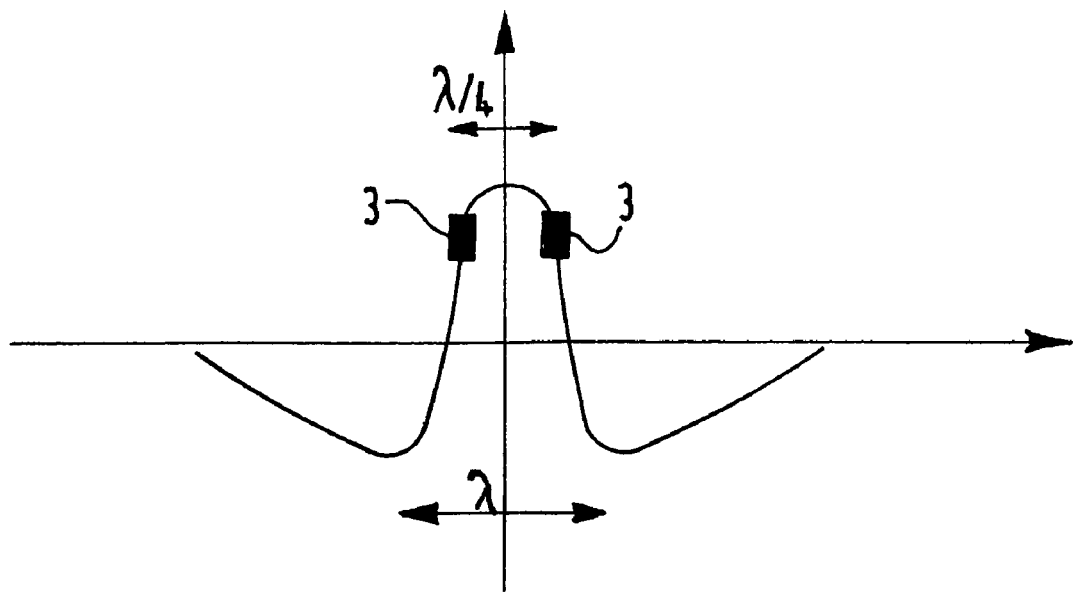
FIG. 2 shows the positioning of two resistive elements in relation to a spatial signal that is locally similar to a portion of a sine curve, in order to obtain an phase shift of π/2 between the signals emitted by the resistive elements.
Figure 6A:
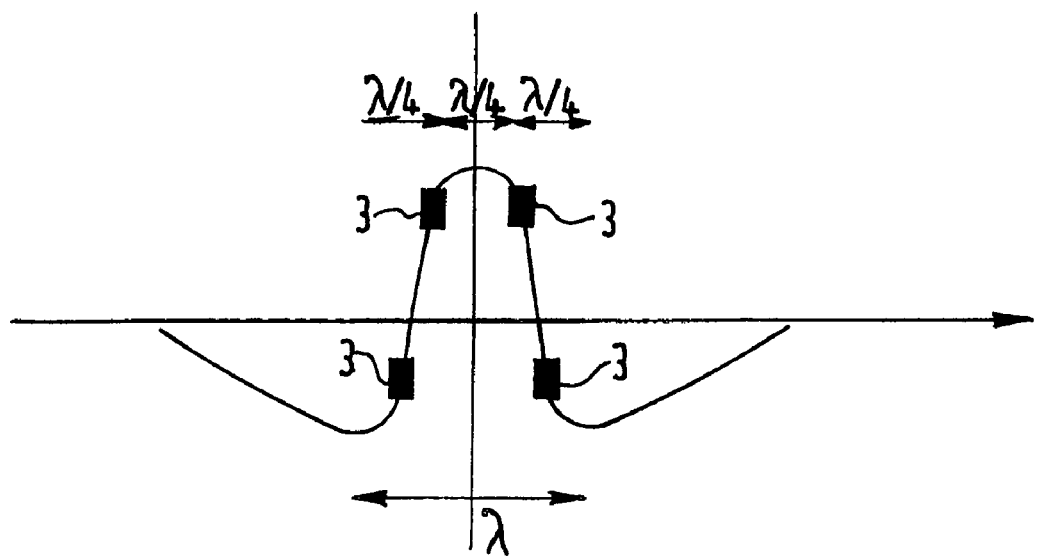
FIGS. 6a and 6b are representations similar to FIG. 2 for the positioning of four resistive elements.
Figure 6B:
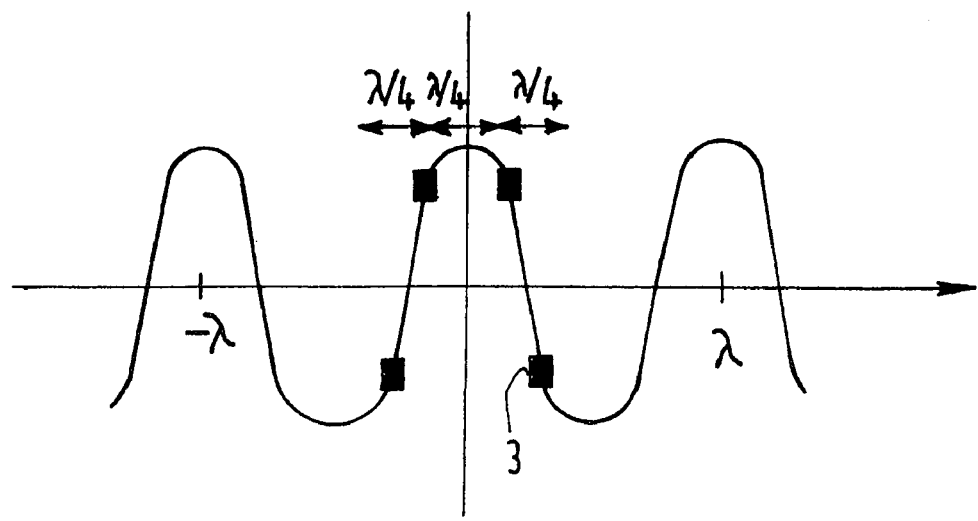
Figure 5:
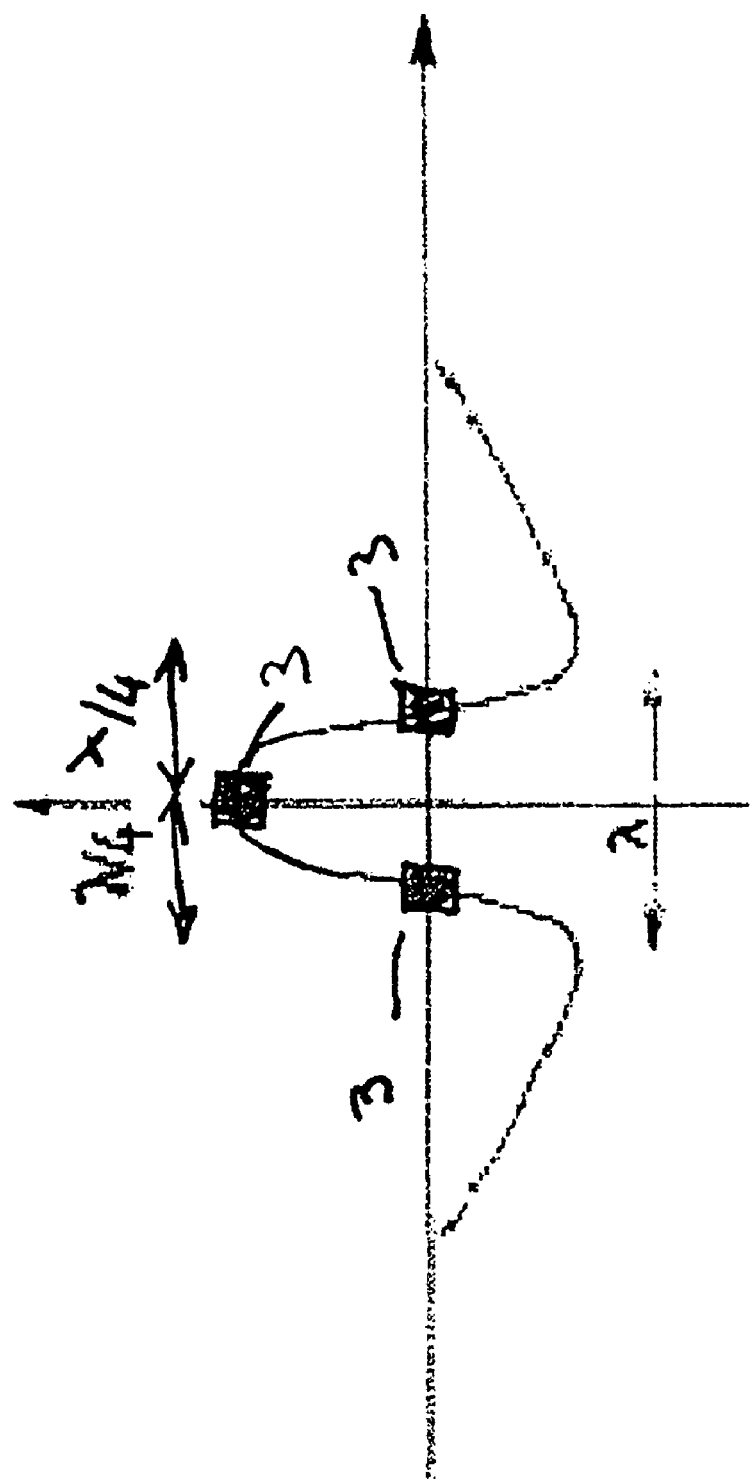
FIG. 5 is a representation similar to FIG. 2 for the positioning of three resistive elements.

The resistive elements 3 serially mounted in the current loop are placed along the pseudo-sinusoidal signal at regular intervals (FIGS. 2, 5, 6).

In relation to FIGS. 1 to 9, three embodiments of the current loop assembly and of the processor are described, the resistive elements 3 being based on resistive elements. In particular, each sensitive element 3 can comprise either a block of several individual resistive elements combined to obtain an averaged resistance value that is representative of the resistance value at the level of the block position, or a single resistive element.

In the current loop assembly, the resistance variation signals are equal to:

$[R_{0i}+\Delta R_i \sin(\theta+(i-1)\phi)]i_c$, $R_{0i}$ being the value at rest of the resistance $R_i$, $\phi$ being the spatial phase shift between the resistive elements 1, $i_c$ being the intensity of the current in the loop.

In the static case, the angle $\theta$ is the angle of the sine curve. In the case of a dynamic deformation, the angle $\theta$ is equal for example to $\omega t$, where $\omega=2\pi/T$ (T being the temporal period of the sine curve).

The processor comprises a first stage of differential amplifiers 4, each of said amplifiers being respectively connected to the terminals of a sensitive element 3 in order to deliver a signal $V_i=G_i[R_{0i}+\Delta R_i \sin(\theta+(i-1)\phi)]i_c$, where $G_i$ is the gain of said differential amplifier.

The processor can also comprise a stage of filtering the signals, not shown.

According to the first embodiment (FIGS. 1 and 3), the sensor 2 comprises two resistive elements 3, the current loop assembly also comprising a reference resistive element with a value $R_{ref}$ set according to the signals emitted by the encoder 1. The signal $V_{ref}$ at the terminals of the reference element is then equal to $G_{ref}R_{ref}i_c$.

The processor also comprises a second stage of differential amplifiers 5 arranged to subtract the signal $V_{ref}$ from the signals $V_i$, which is to say, to form the signals:

$S_1 = [(G_1 R_{01} - G_{ref} R_{ref}) + G_1 \Delta R_1 \sin(\theta)] i_c;$ $S_2 = [(G_2 R_{02} - G_{ref} R_{ref}) + G_2 \Delta R_2 \sin(\theta + \phi)] i_c;$ If $G_1$, $G_2$ and $G_{ref}$ are chosen so that $G_1 R_{01} = G_2 R_{02} = G_{ref} R_{ref}$, then the following signals are obtained:

$S_1 = [G_1 \Delta R_1 \sin(\theta)] i_c;$ $S_2 = [G_2 \Delta R_2 \sin(\theta + \phi)] i_c;$ which centre on zero by subtracting the reference signal $G_{ref} R_{ref} i_c$.

Furthermore, the resistive elements 3 can be designed so that they have the same sensitivity, which is to say $G_1 \Delta R_1 = G_2 \Delta R_2 = G \Delta R$. Then, the signals are written:

$S_1 = [G \Delta R \sin(\theta)] i_c;$ $S_2 = [G \Delta R \sin(\theta + \phi)] i_c;$ In the specific case in which the resistive elements are arranged so that $\phi = \pi/2$, which is to say that the distance between the resistive elements 3 is equal to $\lambda/4$ ($\lambda$ being the period of the sine curve, see FIG. 2), the signals are written:

$S_1 = [G \Delta R \sin \theta] i_c;$ $S_2 = [G \Delta R \cos \theta] i_c;$

Consequently, in this specific case, the determination system shown in FIG. 1 makes it possible directly to obtain the signals $COS = S_2$ and $SIN = S_1$, which are in quadrature and with the same amplitude.

Figure 3:
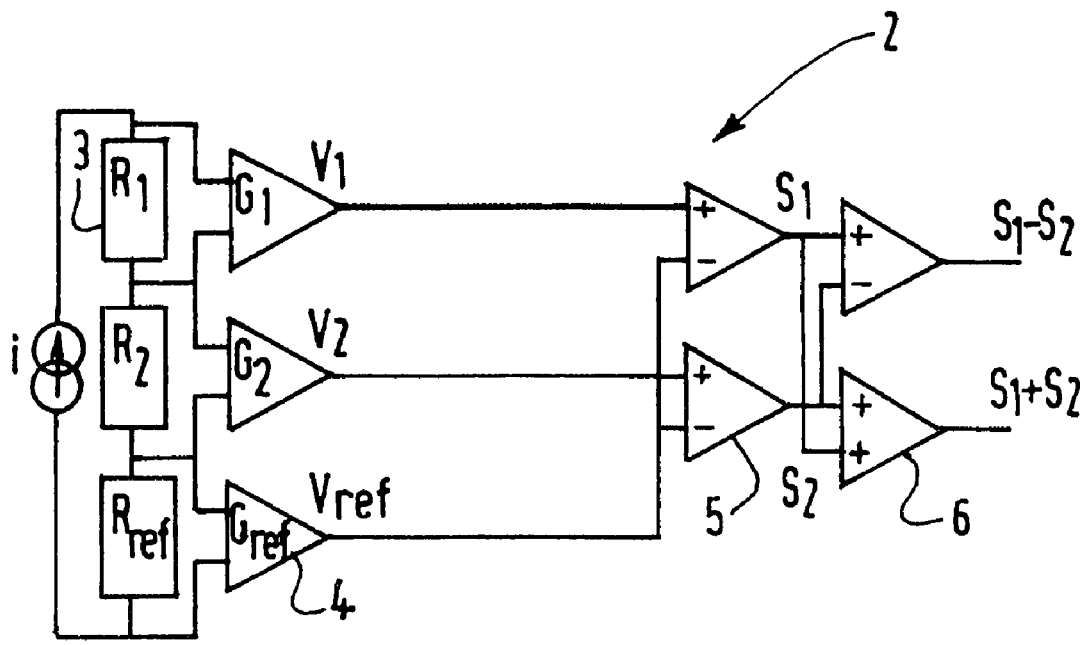
FIG. 3 is a functional representation of a variation of the sensor according to FIG. 1.

As regards FIG. 3, it describes a processor that makes it possible to obtain SIN and COS signals regardless of the value of the spatial phase shift $\phi$ between the resistive elements 3.

For this purpose, the processor comprises a third stage with two differential amplifiers 6 in order to deliver the signals $S_1 - S_2$ and $S_1 + S_2$.

Indeed, these expressions are written:

$$S_1 - S_2 = \left[-2G\Delta R \sin\left(\frac{\phi}{2}\right) \times \cos\left(\theta + \frac{\phi}{2}\right)\right] i_c; \text{ and}$$

$$S_1 + S_2 = \left[2G\Delta R \cos\left(\frac{\phi}{2}\right) \times \sin\left(\theta + \frac{\phi}{2}\right)\right] i_c$$

We therefore have that $S_1 + S_2 = SIN$ and $S_1 - S_2 = COS$.

It should be noted that, in the case of $\phi$ being other than $\pi/2$, the amplitude of the signals $(S_1 - S_2)$ and $(S_1 + S_2)$ is different. In order to equalize these amplitudes, it is possible for at least one differential amplifier 6 of the third stage to have adjustable gain. In particular, the gain of the amplifier forming the COS signal can be adjusted to $$\cos\left(\frac{\phi}{2}\right) / \sin\left(\frac{\phi}{2}\right).$$

According to the second embodiment (FIG. 4), the sensor comprises three resistive elements 3 and three differential amplifiers of the first stage 4 have adjustable gain $G_i$.

Figure 4:
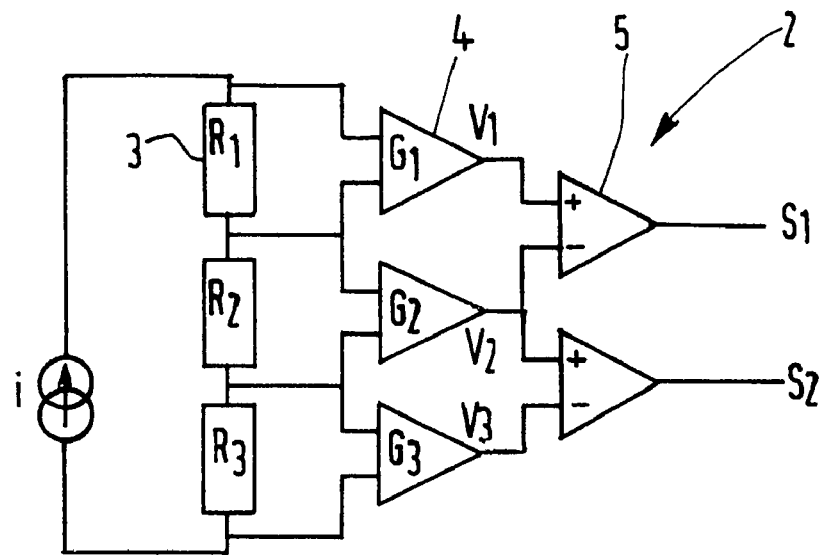
FIG. 4 is a functional representation of a second embodiment of a sensor of a determination system according to the invention.

At the output of the first stage of differential amplifiers 4, the following signals are therefore obtained:

$V_1 = G_1 \times (R_{01} + \Delta R_1 \sin \theta) i_c$ $V_2 = G_2 \times (R_{02} + \Delta R_2 \sin(\theta + \phi)) i_c$ $V_3 = G_3 \times (R_{03} + \Delta R_3 \sin(\theta + 2\phi)) i_c$ According to the embodiment shown in FIG. 4, the second stage is arranged to form the following signals:

$$S_1 = V_1 - V_2 = [(G_1 R_{01} - G_2 R_{02}) + G_1 \Delta R_1 \sin \theta - G_2 \Delta R_2 \sin(\theta + \phi)] \times i_c \quad (1)$$

$$S_2 = V_2 - V_3 = [(G_2 R_{02} - G_3 R_{03}) + G_2 \Delta R_2 \sin(\theta + \phi) - G_3 \Delta R_3 \sin(\theta + 2\phi)] \times i_c \quad (2)$$

By adjusting the gains $G_i$ so that: $G_1 R_{01} = G_2 R_{02} = G_3 R_{03}$, and assuming that the sensors have the same sensitivity, which is to say that $G_1 \Delta R_1 = G_2 \Delta R_2 = G_3 \Delta R_3 = G \Delta R$, the differences (1) and (2) become:

$$S_1 = [G \Delta R [\sin \theta - \sin(\theta + \phi)]] \times i_c \quad (3)$$

$$S_2 = [G \Delta R [\sin(\theta + \phi) - \sin(\theta + 2\phi)]] \times i_c \quad (4)$$

In the specific case of the resistive elements 3 being arranged at a distance from the pseudo-sinusoidal signal so that $\phi = \pi/2$, which is to say, along the spatial period and equidistant from $\lambda/4$ (see FIG. 5), the differences (3) and (4) are written:

$S_1 = [\sqrt{2} G \Delta R \cos(\theta + \pi/4)] \times i_c$ $S_2 = [\sqrt{2} G \Delta R \sin(\theta + \pi/4)] \times i_c$ Consequently, in this specific case, the sensor 2 shown in FIG. 4 makes it possible directly to obtain the signals $COS = S_1$ and $SIN = S_2$ in quadrature and with the same amplitude.

According to the third embodiment (FIGS. 7 to 9), the sensor comprises four resistive elements 3 and the four differential amplifiers of the first stage 4 have adjustable gain $G_i$.

At the output of the first stage of differential amplifiers 4, the following signals are therefore obtained:

$V_1 = G_1 \times (R_{01} + \Delta R_1 \sin \theta) i_c$ $V_2 = G_2 \times (R_{02} + \Delta R_2 \sin(\Delta + \Delta)) i_c$ $V_3 = G_3 \times (R_{03} + \Delta R_3 \sin(\Delta + 2\Delta)) i_c$ $V_4 = G_4 \times (R_{04} + \Delta R_4 \sin(\theta + 3\phi)) i_c$ The processor also comprises a second stage of differential amplifiers 5 arranged to subtract signals emitted from the first stage of differential amplifiers.

Figure 7:
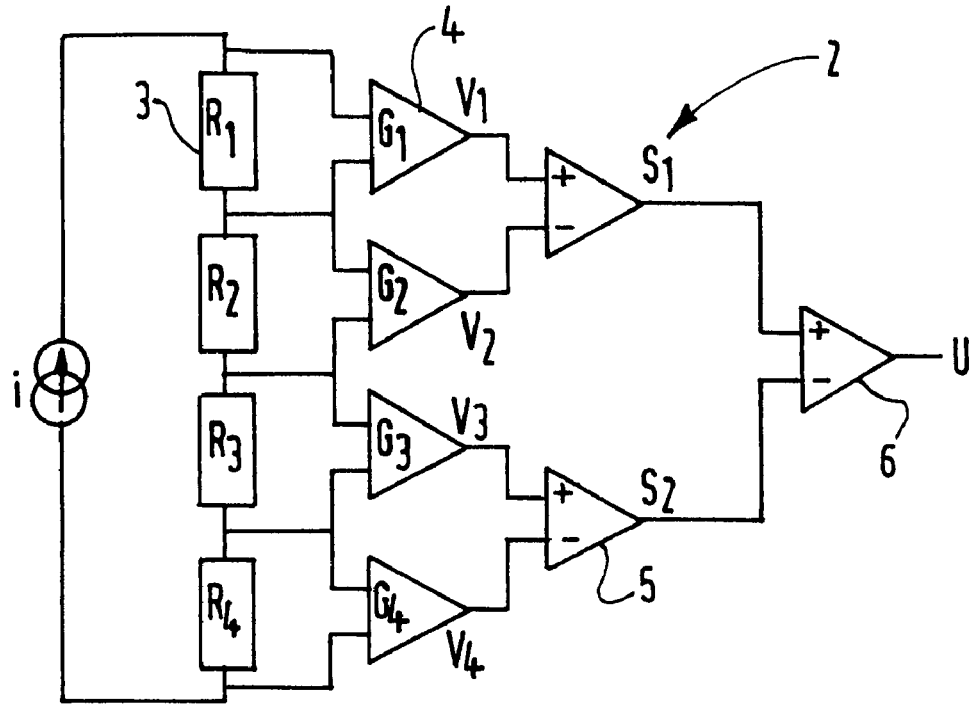
FIGS. 7 and 8 are functional representations of a third embodiment of a sensor of a determination system according to the invention.

According to the embodiment shown in FIG. 7, the second stage is arranged to form the following signals:

$$S_1 = V_1 - V_2 = [(G_1 R_{01} - G_2 R_{02}) + G_1 \times R_1 \sin \theta - G_2 \Delta R_2 \sin(\theta + \phi)] \times i_c \quad (5)$$

$$S_2 = V_3 - V_4 = [(G_3 R_{03} - G_4 R_{04}) + G_3 \Delta R_3 \sin(\theta + 2\phi) - G_4 \Delta R_4 \sin(\theta + 3\phi)] \times i_c \quad (6)$$

Figure 8:
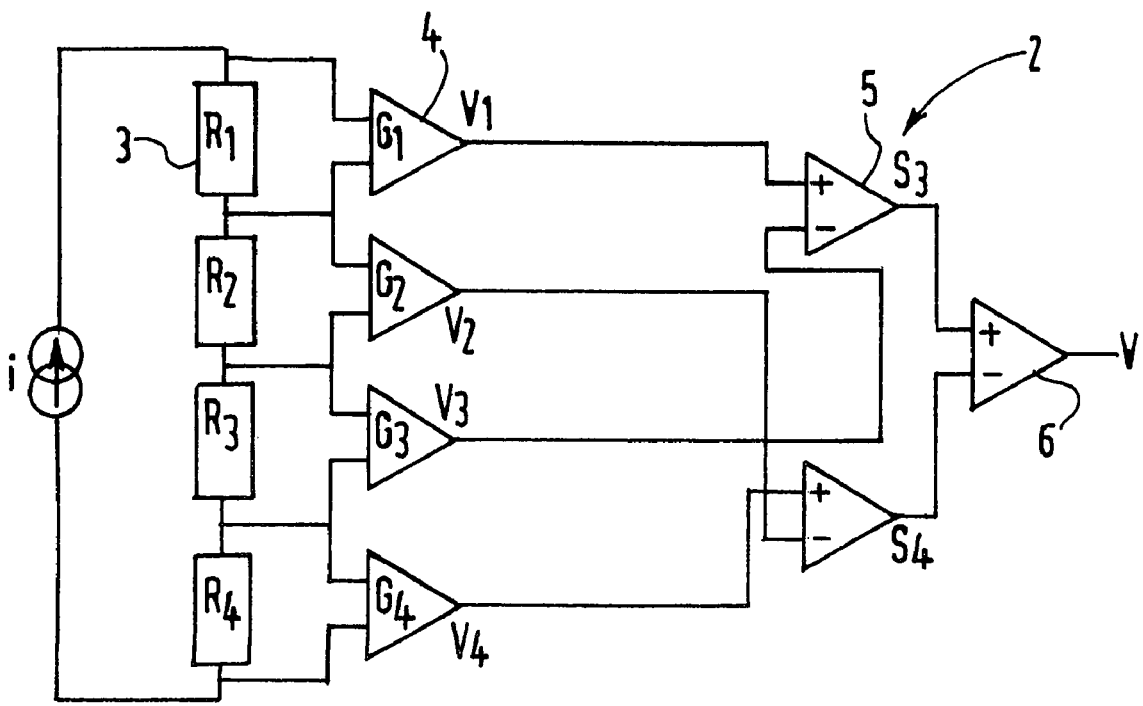
Figure 9:
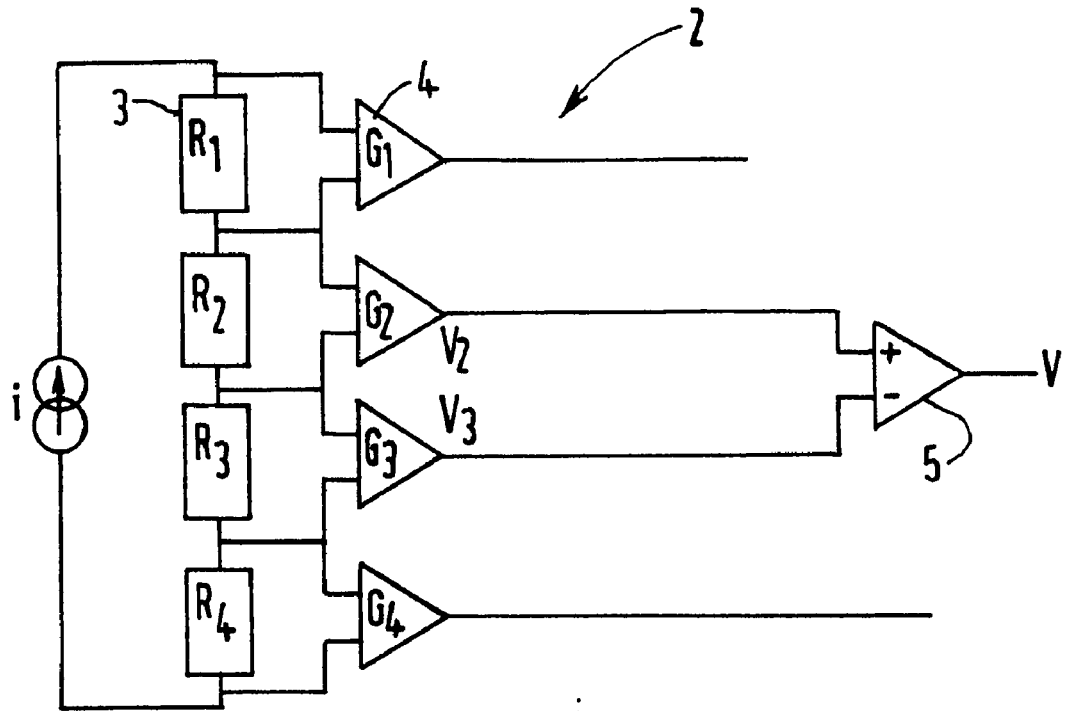
FIG. 9 is a variation of the representation of FIG. 8.

By adjusting the gains $G_i$ so that: $G_1 R_{01} = G_2 R_{02} = G_3 R_{03} = G_4 R_{04}$, and assuming that the sensors have the same sensitivity, which is to say that $G_1 \Delta R_1 = G_2 \Delta R_2 = G_3 \Delta R_3 = G_4 R_{04} = G \Delta R$, the differences (5) and (6) become:

$S_1 = [G \Delta R [\sin \theta - \sin(\theta + \phi)]] \times i_c$ $S_2 = [G \Delta R [\sin(\theta + 2\phi) - \sin(\theta + 3\phi)]] \times i_c$ As regards FIGS. 7 to 9, they describe a processor that makes it possible to obtain SIN and COS signals regardless of the value of the spatial phase shift φ between the resistive elements 3.

For this purpose, the second stage of differential amplifiers 5 is arranged to deliver four signals and the processor comprises a third stage of differential amplifiers 6 arranged to subtract the four signals emitted by the second stage, two at a time.

The second stage delivers the signals $S_1$ and $S_2$ according to the relations (5) and (6) mentioned above, but also in a similar manner the signals $S_3=V_1-V_3$ and $S_4=V_4-V_2$.

The third stage comprises two differential amplifiers 6 respectively shown in FIGS. 7 and 8 for the purpose of clarity, which can deliver the signals:

$U=[S_1-S_2]$; and $V=[S_3-S_4]$

Or according to the relations (3) and (4):

$$U = \left[-4G\Delta R\sin(\varphi) \times \sin\left(\frac{\varphi}{2}\right) \times \sin\left(\theta + \frac{3\varphi}{2}\right)\right]i_c$$

$$V = \left[-4G\Delta R\sin(\varphi) \times \cos\left(\frac{\varphi}{2}\right) \times \cos\left(\theta + \frac{3\varphi}{2}\right)\right]i_c$$

This therefore means that U=SIN and V=COS.

It should be noted that, in the case of φ being other than π/2, the amplitude of the signals U and V is different. In order to equalize these amplitudes, it is possible for at least one differential amplifier 6 of the third stage to have adjustable gain. Particularly, the gain of the amplifier 6 forming the U signal can be added to $$\cos\left(\frac{\varphi}{2}\right)/\sin\left(\frac{\varphi}{2}\right),$$

y being a known constant as an parameter for matching the position of the resistive elements 3 with the signal to be measured.

As a variation of the embodiment shown in FIGS. 7 and 8, the third stage of the processor comprises an amplifier 6 according to FIG. 7 and the second stage comprises an amplifier 5 according to FIG. 9, which is arranged to deliver the signal $S_3=V_2-V_3$. Thus, the signals delivered by the processor 2 are:

$U=[S_1-S_2]$; and $V=2S_3$

This variation is particularly suited for cases in which the amplitude of the signals $V_i$ cannot be considered to be identical, which is to say that the elements 3 do not detect a sine curve with the same amplitude, which is particularly the case when the resistive elements 3 are tilted in relation to the encoder 1.

The determination system according to the invention also comprises a device 7 for calculating the position of the element, which can possibly be integrated in the sensor 2 or be housed in a host calculator.

The calculator 7 comprises means for calculating the position of the encoder 1 according to SIN and COS signals in quadrature and with the same amplitude, so as to deduce the position of the element according to the calculated position of the encoder 1. Such a calculator 7, of a known type, makes it possible to calculate the expression $SIN^2+COS^2$ in order to determine the amplitude of the signal, the arctan (SIN/COS) to determine the angle of the signal or even provide means for interpolating and counting pulse edges created from SIN and/or COS signals in order to obtain the position in an incremental manner. The calculator 7 can also comprise means for resetting the position of the element in relation to the calculated position of the encoder 1.

In addition, the calculator can comprise means for determining, according to the calculated position, at least one movement parameter of the element, in particular, the speed, the acceleration or the direction of movement of said element in relation to the fixed structure.

Figure 10:
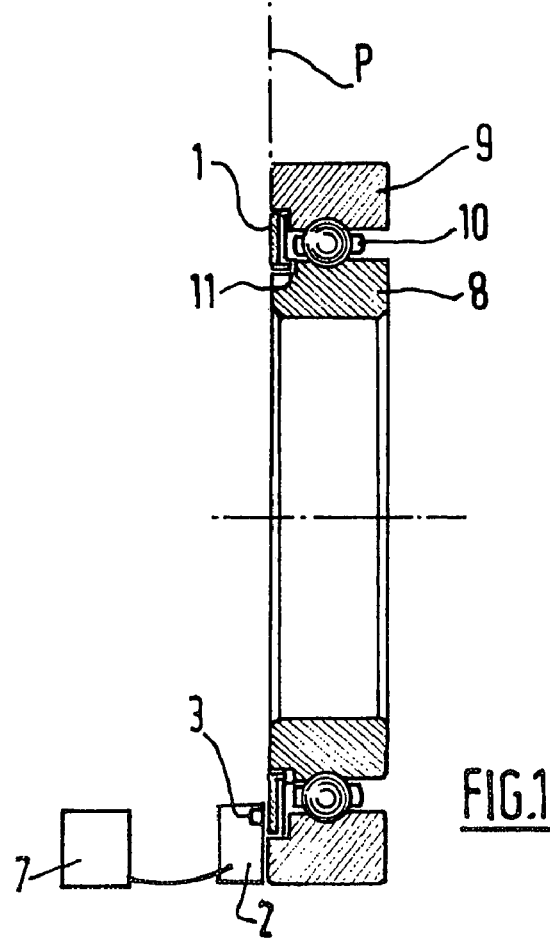
FIG. 10 is a diagrammatic longitudinal section view of an rolling bearing equipped with a determination system according to the invention.

The invention also relates to a rolling bearing as shown in FIG. 10, equipped with a system for determining the angular position of the rotating ring 8 in relation to the fixed ring 9.

The rolling bearing comprises a fixed outer ring 9 designed to be associated with a fixed element, a rotating inner ring 8 designed to be placed in rotation by the rotating element and rolling bodies 10 arranged between said rings.

In the embodiment shown, the encoder is moulded over an annular cylindrical seat of a frame 11 which is associated, for example by fitting, on one face of the inner ring 8. In particular, the encoder 1 consists of a ring in which the outer face comprises a succession of north and south poles with a constant polar width.

The encoder 1 is associated with the rotating ring 8 so that the outer face of said encoder is substantially contained in the plane P of a lateral face of the fixed ring 9. This characteristic, in particular disclosed in document EP-0 607 719 filed by the applicant, makes it possible on the one hand to protect the encoder 1 inside the bearing and, on the other hand, to be able to separate the sensor 2 from the bearing while ensuring the air gap is respected. Thus, the encoder 1 can either be attached to the outer ring 9, or associated with the fixed element of the resistive elements 3 at read range from the encoder 1. In particular, the sensor 2 can comprise four tunnel effect magnetoresistive elements 3 such as described previously.

Among the advantages of using a determination system according to the invention are the following:

the lack of a reference resistance in the case of the second and third embodiments;

the lack of any need to use resistive elements 3 with opposite sensitivities as in the case of Wheatstone bridge assembly. It is not therefore necessary to place the reference layers of certain tunnel effect magnetoresistive elements in different directions;

the possibility of adjusting the conditioning to different no-load value resistances $R_{0i}$, knowing for example a certain dispersion of the manufacturing method of the resistive elements 3;

being able to separate the resistive elements 3 from the conditioning (in an area where the latter is, for example, protected from high temperatures) while remaining insensitive to the resistance of the connection wires and to the electric disturbances detected on these same wires (common-mode noise);

being able to adapt the sensor to signals with different spatial periods.

In addition, the determination system makes is possible, as it must amplify the signal, to remove its continuous component, and to do so while remaining insensitive to the changes in the no-load value of the various resistances.

The invention claimed is:

1. System for determining the position of a mobile element in relation to a fixed structure, said system comprising:
   an encoder designed to be solidly attached to the mobile element in order to move together with the latter, said encoder being arranged to emit a pseudo-sinusoidal signal that represents the position of the encoder;
   a sensor designed to be solidly attached to the fixed structure, said sensor comprising:
      at least two resistive elements each capable of delivering a signal $V_i$ according to the pseudo-sinusoidal signal emitted, said resistive elements being disposed at read range from the pseudo-sinusoidal signal emitted by the encoder;
      a current loop assembly for connecting the resistive elements in series;
      a processor for processing the signals $V_i$ and for supplying, according to the signals $V_j$, a SIN signal and a COS signal in quadrature and with the same amplitude;
      a calculator for calculating the position of the mobile element, said calculator comprising means for calculating the position of the encoder from the SIN and COS signals so at to deduce the position of the element from the calculated position of the encoder.

2. Determination system according to claim 1, characterised in that the processor comprises a first stage of differential amplifiers, each of said amplifiers being respectively connected to the terminals of a sensitive element so as to deliver a signal $V_i$.

3. Determination system according to claim 2, characterised in that it comprises three sensitive elements and in that the processor comprises a first stage of three differential amplifiers, each of said amplifiers being respectively connected to the terminals of a sensitive element so as to deliver a signal $V_i$.

4. Determination system according to claim 2, characterised in that the sensor comprises two sensitive elements, the current loop assembly also comprising a reference element ($R_{ref}$) delivering a reference signal $V_{ref}$ and the processor comprising a second stage of differential amplifiers arranged to subtract the signal $V_{ref}$ from the signal $V_i$.

5. Determination system according to claim 4, characterised in that the processor comprises a third stage of differential amplifiers respectively arranged to add and subtract the signals emitted by the second stage of differential amplifiers.

6. Determination system according to claim 2, characterised in that the sensor comprises four sensitive elements, the processor comprising a second stage of differential amplifiers arranged to subtract signals emitted by the first stage of differential amplifiers.

7. Determination system according to claim 6, characterised in that the second stage of differential amplifiers is, arranged to deliver four signals, the processor comprising a third stage of differential amplifiers arranged to subtract the four signals emitted by the second stage of differential amplifiers, two at a time.

8. Determination system according to any one of the claims from 2 to 7, characterised in that at least some of the differential amplifiers have adjustable gain.

9. Determination system according to any one of the claims from 1 to 7, characterised in that the sensitive elements are based on resistive elements each of which has an electrical resistance Ri that varies according to the pseudo-sinusoidal signal emitted by the encoder.

10. Determination system according to claim 9, characterised in that the resistive elements are based on magnetoresistors, giant magnetoresistors or tunnel effect magnetoresistors, so that each of them has electrical resistance $R_i$ that varies according to a magnetic pseudo-sinusoidal signal emitted by the encoder.

11. Determination system according to claim 10, characterised in that the encoder comprises an alternating succession of north and south magnetic poles.

12. Determination system according to claim 1, characterised in that the calculator also comprises means for determining, according to the calculated position, at least one of a plurality of movement parameters of the element, the plurality of movement parameters comprising the speed of said element, the acceleration of said element, and the direction of movement of said element in relation to the fixed structure.

13. Determination system according to claim 1, characterised in that the sensor comprises two parts, a first part containing the sensitive elements and a second part containing, the processor, the two parts being connected to each other by connection wires.

14. Determination system according to any one of the claim 1 to 7, 12 or 13, characterised in that each sensitive element is formed by a block of several individual resistive elements.

15. Rolling bearing comprising a fixed ring and a ring rotating in relation to said fixed ring by means of rolling bodies, said rolling bearing being equipped with a system according to claim 1 in order to determine the angular position of the rotating ring in relation to the fixed ring, wherein the encoder is solidly attached to the rotating ring and the sensor is solidly attached to the fixed ring.

* * * * *